(12) United States Patent
Athsani et al.

(10) Patent No.: US 8,406,424 B2
(45) Date of Patent: Mar. 26, 2013

(54) VISUAL UNIVERSAL DECRYPTION APPARATUS AND METHODS

(75) Inventors: Athellina R. Ahmad Athsani, San Jose, CA (US); Chris T. Kalaboukis, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1139 days.

(21) Appl. No.: 11/924,009

(22) Filed: Oct. 25, 2007

(65) Prior Publication Data

US 2009/0110194 A1   Apr. 30, 2009

(51) Int. Cl.
*H04L 29/06* (2006.01)
(52) U.S. Cl. ........................ 380/200; 713/168
(58) Field of Classification Search .................. 380/200; 713/168
See application file for complete search history.

(56) References Cited

U.S. PATENT DOCUMENTS

| | | | |
|---|---|---|---|
| 6,708,200 B1 * | 3/2004 | Ura et al. ...................... | 709/203 |
| 7,091,989 B2 | 8/2006 | Gibbs et al. | |
| 2002/0101988 A1 * | 8/2002 | Jones .............................. | 380/54 |
| 2003/0065768 A1 | 4/2003 | Malik | |
| 2003/0095681 A1 | 5/2003 | Burg et al. | |
| 2004/0076294 A1 * | 4/2004 | Shibata et al. ................ | 380/201 |
| 2004/0151311 A1 * | 8/2004 | Hamberg et al. ............... | 380/44 |
| 2007/0003102 A1 * | 1/2007 | Fujii et al. ..................... | 382/100 |
| 2007/0250912 A1 * | 10/2007 | Rassool et al. .................... | 726/4 |
| 2008/0298596 A1 * | 12/2008 | Kuraki et al. ................. | 380/283 |

OTHER PUBLICATIONS

Mediaseek releases "Camera Dictionary" the application that translates English words by simply scanning the mobiles' camera over words. http://wwww.slashphone.com/64/51775.html, printed Oct. 4, 2007 (3 pages).
Derbyshire, D. "Phones or iPod a thing of the past," http/www.dailymail.co.uk/pp./live/articles/news/news. Html?in_article_id-533358&in_...printed Mar. 21, 2008 (pp. 3-11).
Future of Internet Search: Mobile version, http://petitinvention.wordpres s.com/2008/02/10/future-of-interest-search-mobile-version/ printed Mar. 21, 2008 (pp. 1-19).
Google Mobile—SMS http://www.google.com/intl/en_us/mobile/default/sms.html, printed Feb. 4, 2009 (2 pages).
Yahoo! Babel Fish—Text Translation and Web Page Translation, http://babelfish.yahoo.com/, printed Feb. 4, 2009.
Attributor: Overview—Monitor your content and improve your content syndication, http://www.attributor.com/how_it_works/overview.php, printed Feb. 4, 2009 (12 pages)
Google, Neven Vision & Image Recognition, Search Engine Journal, http://www.searchenginejournal.com/google-neven-vision-image-recognition/3728/#more-3728, printed Feb. 4, 2009.
Downloads—pgp.comFree PGP Encryption Platform Evaluation—Download PGP Univers . . . http://www.pgp.com/downloads/destoptrial/index.html printed Feb. 4, 2009 (1 page).
PGP Whole Disk Encryption—Comprehensive Hard Drive Encryption for PC's, Laptops and . . . http://www.pgp.com/products/wholediskencryption/index.html, printed Feb. 4, 2009, (2 pages).
Callas J., et al. Open PGP Message Format; http://www.ietf.org/rfc/rfc2440.txt, Request for Comments 2440, International Engineering Task Force, Nov. 1998.

* cited by examiner

*Primary Examiner* — Jason Gee
(74) *Attorney, Agent, or Firm* — Weaver Austin Villeneuve & Sampson LLP

(57) ABSTRACT

Disclosed is a virtual universal decryption (VUD) service that provides a mechanism for allowing users of camera enabled mobile devices to use their camera to decrypt messages. The VUD service can provide a mechanism for a user of a VUD enabled device to authorize one or more other users of VUD enabled and camera enabled devices to use their cameras to decrypt messages sent by the authorizing user. The VUD service may then provide mechanisms for the authorized users to decrypt messages, which have been encrypted by the authorizing users, by simply capturing an image/video of the encrypted text with a camera of their VUD enabled devices.

21 Claims, 6 Drawing Sheets

VISUAL UNIVERSAL DECRYPTION APPARATUS AND METHODS

BACKGROUND OF THE INVENTION

The field of the present invention relates computer implemented applications. More particularly, it relates to providing mobile applications for mobile devices.

The use of mobile devices, such as cellular phones, portable gaming consoles, or personal digital assistant (PDA) devices, has increased dramatically in the last decade. Often, such mobile devices include a camera and display for displaying images at which the camera is pointed. Since people usually carry their camera-capable mobile devices with them to a number of settings, it would be beneficial to provide additional mobile applications for utilizing the camera and display capabilities of such prevalent mobile devices.

SUMMARY OF THE INVENTION

In embodiments of the present invention, a virtual universal decryption (VUD) service is provided to allow users of camera enabled mobile devices to use their camera to decrypt messages. The VUD service can provide a mechanism for a user of a VUD enabled device to authorize one or more other users of VUD enabled and camera enabled devices to use their cameras to decrypt messages sent by the authorizing user. The VUD service may then provide mechanisms for the authorized users to decrypt messages, which have been encrypted by the authorizing users, by simply capturing an image/video of the encrypted text with a camera of their VUD enabled devices.

In one embodiment, a method of performing decryption using a mobile device is disclosed. One or more images or a video of a message that has been captured with a camera of mobile device are provided. The message of the one or more images or video is decrypted so as to provide a decrypted message. The decrypted message is presented in the mobile device.

In a specific implementation, the decrypting operation is performed by receiving a decryption code into the mobile device and automatically using the received decryption code to decrypt the message when a visual universal decryption option is selected. In another implementation, the decrypting operation is performed by automatically sending the message from the mobile device to a visual universal decryption server when a visual universal decryption option is selected and receiving, at the mobile device, a decrypted message that is a result of decrypting the message when a visual universal decryption option is selected.

In another embodiment, presenting the decrypted message comprises displaying the decrypted message in a display of the mobile device. In another aspect, presenting the decrypted message comprises outputting an audio of the decrypted message from an audio device of the mobile device. In yet another feature, the one or more images or video of the message is captured by passing the camera over an encrypted message that is displayed in a display of computer system. In another application, the one or more images or video of the message are captured by passing the camera over an encrypted message that is visually presented on a hardcopy document. In a further embodiment, the decrypting operation is performed after a complete encrypted message has been captured in the one or more images or a video.

In an alternative embodiment, a method of providing encryption for an encrypting user and decryption for use by a mobile device is disclosed. An identity of one or more camera enabled mobile devices, that are authorized to decrypt messages from the user, is received from a first user. An encryption code is sent to the first user for use in encrypting messages generated by the first user. A decryption code is associated with the authorized one or more camera enabled mobile devices. After receiving one or more images or a video that were captured with a camera of a sending one of the authorized mobile devices, a message in the one or more images or video is decrypted based on the decryption code associated with such authorized mobile devices, and the decrypted message is sent to the sending authorized mobile device. In a further aspect, the decryption code is sent to the authorized one or more camera enabled mobile devices.

In another embodiment, the invention pertains to a mobile device having a camera for capturing images/video and a display for displaying the captured images/video. The mobile device further includes processor and a memory that is configured to perform one or more of the above described operations. In another embodiment, the invention pertains to a system having a processor and memory that are configured to perform one or more of the above described operations. In another embodiment, the invention pertains to at least one computer readable storage medium having computer program instructions stored thereon that are arranged to perform one or more of the above described operations.

These and other features will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, apparatus and methods of the present invention provide a visual universal decryption (VUD) service that can be used with camera enabled mobile devices. The VUD service can provide a mechanism for a user of a VUD enabled device to authorize one or more other users of VUD enabled and camera enabled devices to use their cameras to decrypt messages sent by the authorizing user. The VUD service may then provide mechanisms for the authorized users to decrypt messages, which have been encrypted by the authorizing users, by simply capturing an image/video of the encrypted text with a camera of their VUD enabled devices.

Figure 1:
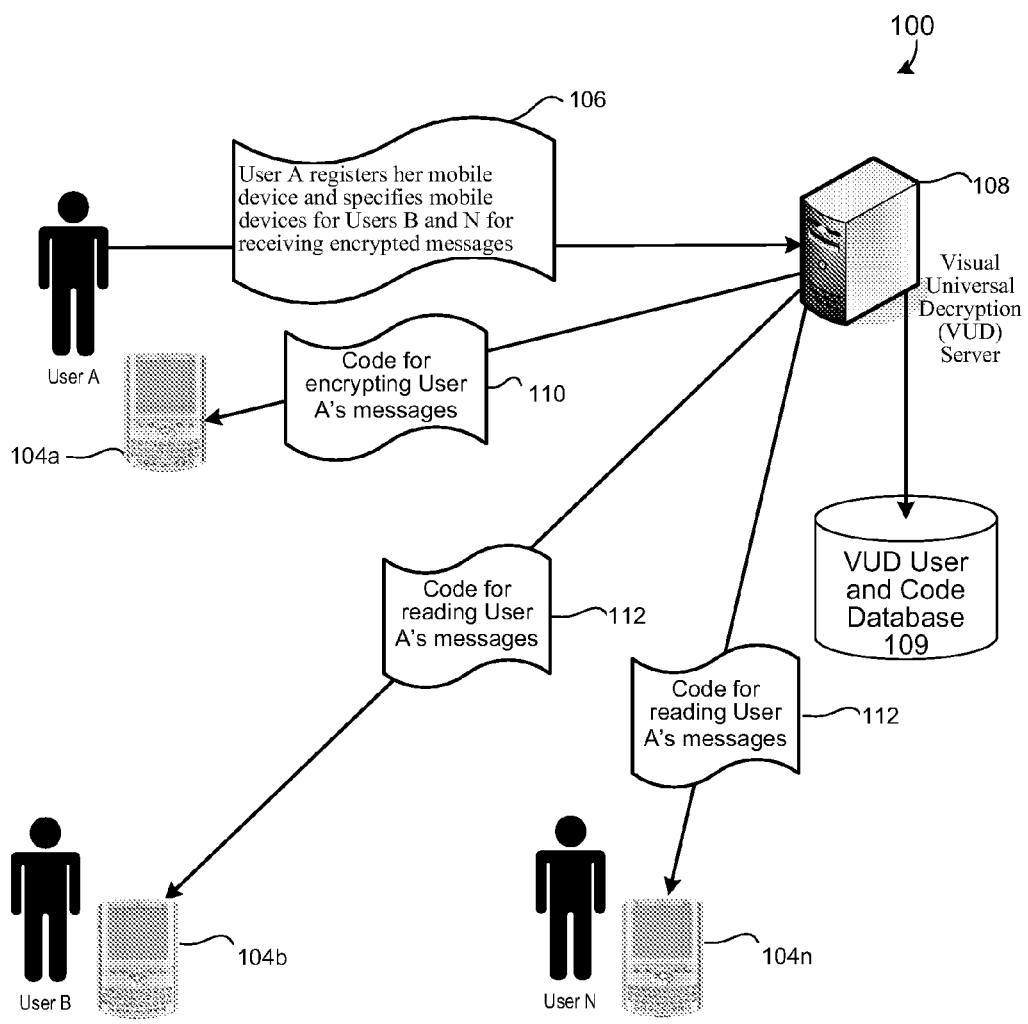
FIG. 1 is a diagrammatic representation of a network in which a Visual Universal Decryption (VUD) service may be implemented in accordance with one implementation of the present invention.

FIG. 1 is a diagrammatic representation of a network 100 in which a Visual Universal Decryption (VUD) service may be implemented in accordance with one implementation of the present invention. As shown, the network 100 may include a VUD server 108 that is configured to receive requests for the VUD service to be authorized for particular users. For example, User A may register for VUD service by sending a registration request 106 to the VUD server 108. During this request, User A may register her own mobile device and specify the mobile devices of Users B and N for receiving encrypted messages from User A and decrypting such messages. User A is, in effect, authorizing specific mobile devices to implement a VUD service to decrypt messages from User A.

In the illustrated example, the VUD server 108 responds to the registration request 106 by sending a code 110 for encrypting User A's messages to User A's mobile device 104a. Alternatively, User A may receive the encryption code at any suitable device for use by such device or another device. That is, the encrypting user does not necessarily have to perform encryption on a camera enabled mobile device. Also, the encryption code can be associated with the receiving user in any suitable manner so that the code can be automatically used to decrypt messages sent by the user. For instance, the encryption code can be associated with the user's email account so that the code is usable from any device from which a user sends email from the associated email account. In this embodiment, the encryption code would have to be accessible in a remote database, such as VUD User and Code database 109, and the encryption code is automatically accessed and used upon sending of a message by the user.

The VUD server 108 may also send codes 112 for reading or decrypting User A's messages by User B's mobile device 104b and User N's mobile device 104n. The encryption and/or decryption codes may be stored by VUD server 108 in one or more VUD User and Code database 109 for later use by the VUD process.

Figure 2A:
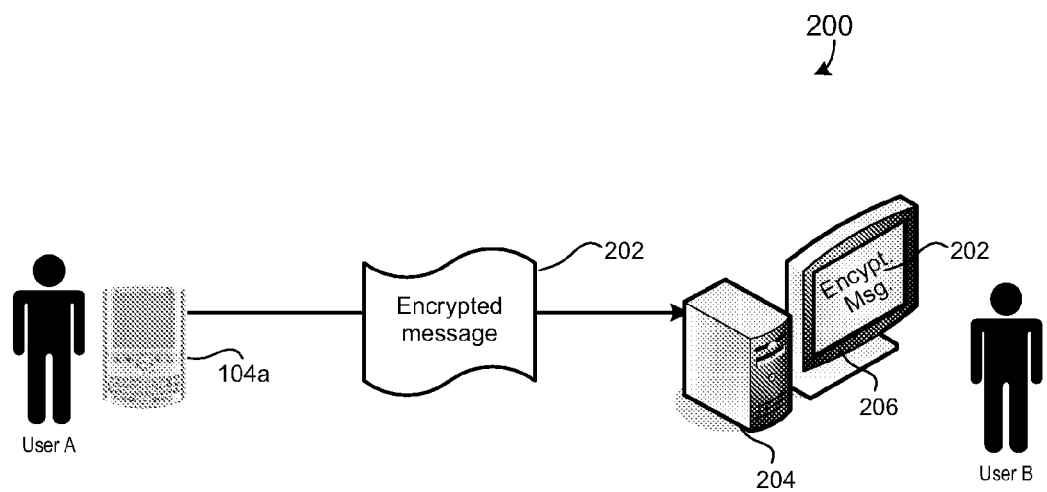
FIG. 2A is a diagrammatic representation of a procedure for sending an encrypted message between users in accordance with one embodiment of the present invention.

FIG. 2A is a diagrammatic representation of a procedure 200 for sending an encrypted message 202 from user A to user B in accordance with one embodiment of the present invention. User A sends a message from any suitable source, such as her mobile device 104a. The message is encrypted into encrypted message 202 based on the encryption code associated with User A, and this encrypted message 202 is sent to User B. User B receives the encrypted message 202 on any suitable device, such as a display 206 of computer system 204.

Figure 2B:
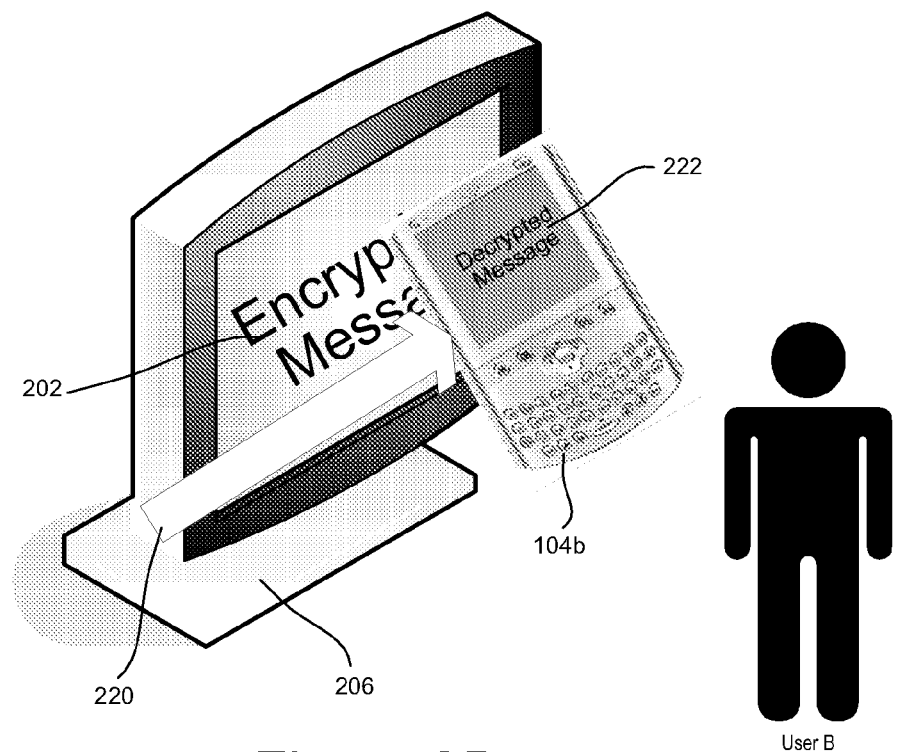
FIG. 2B is a diagrammatic representation of a process of decrypting an encrypted message with a mobile device in accordance with one implementation of the present invention.

FIG. 2B is a diagrammatic representation of a process for decrypting an encrypted message, using a camera enabled mobile device, in accordance with one implementation of the present invention. User B, upon receiving encrypted message 202 on display 206, may pass the camera of her authorized mobile device 104b over the displayed encrypted message 202, for example, in direction 220. When the encrypted message 202 is captured by the camera of the mobile device 104b, the previously received code is used to automatically decrypt the received encrypted message 202, and a decrypted message 222 is automatically displayed on the mobile device. Alternatively or additionally, an auditory decrypted message may be output from an audio device of the mobile device, e.g., through headphones or a speaker.

Figure 3:
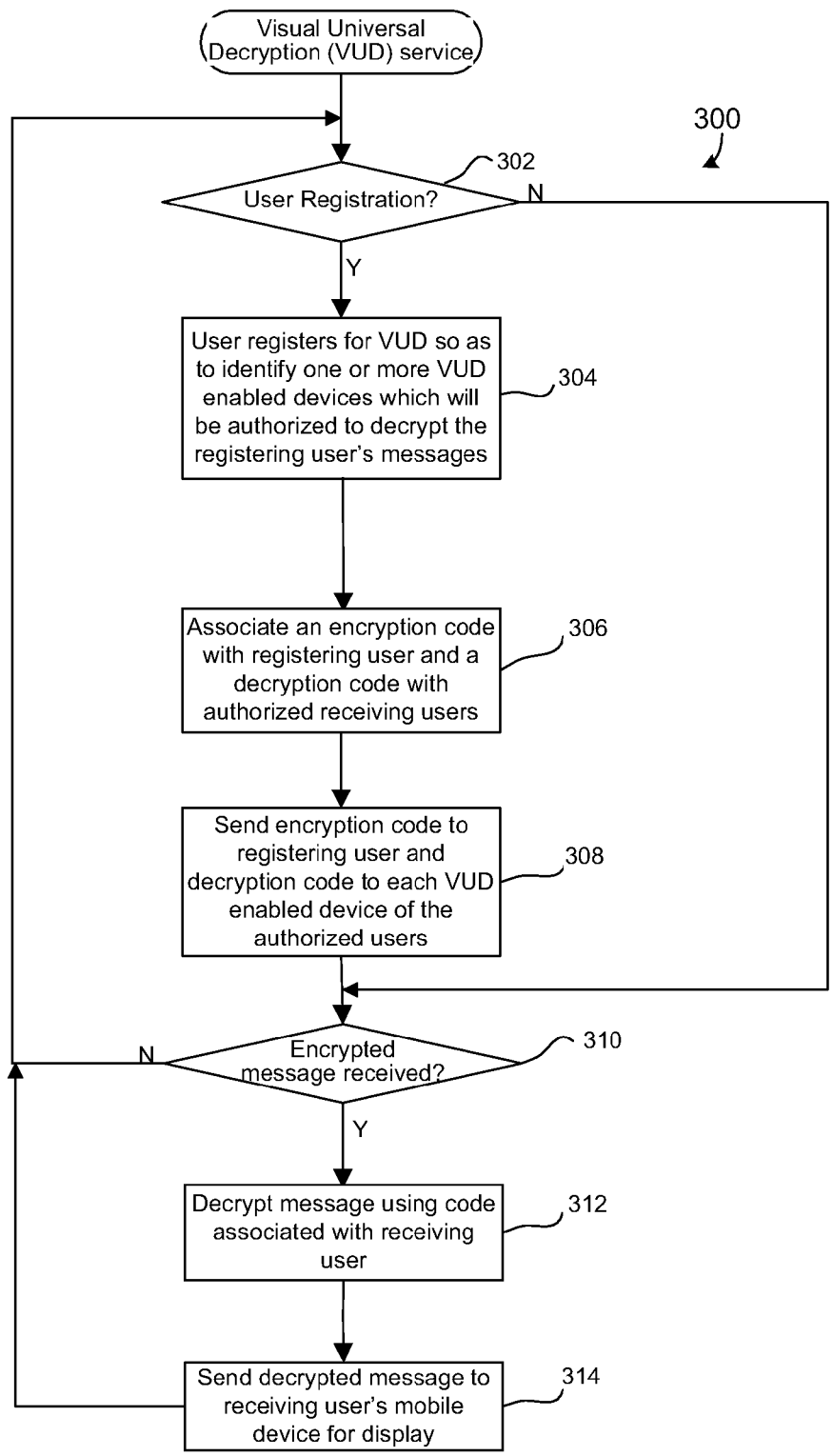
FIG. 3 is a flowchart illustrating a Visual Universal Decryption (VUD) service in accordance with one embodiment of the present invention.

FIG. 3 is a flowchart illustrating a Visual Universal Decryption (VUD) service 300 in accordance with one embodiment of the present invention. The VUD procedure 300 of FIG. 3 is described below with respect to a single VUD server for handling VUD for a plurality of users of mobile devices. Of course, this VUD procedure may be implemented with respect to any number and type of camera enabled devices and with respect to users in a diverse cellular and/or computer network as described further below. A mobile device, as referred to herein, may include any camera enabled device that is portable and may include, by way of examples, cellular phones, portable gaming consoles, or personal digital assistant (PDA) devices, portable computer systems, etc.

Initially, it may be determined whether user registration has occurred in operation 302. If user registration has occurred, the user registers for VUD so as to identify one or more other mobile devices (and their users) which will be authorized to decrypt the registering user's messages in operation 304. For example, the registering user enters her own phone number for her camera enabled mobile device and enters a mobile phone number for each camera enabled cellular phone of the users who the registering user wishes to be able to decrypt messages. The registering user may optionally not be required to enter an identity for her own device.

Users may register their own device to be VUD enabled at any suitable time. For example, a user may visit a VUD server and download a VUD application for use by a mobile device, and such VUD application enables encryption to be performed on text with the user's mobile device. During this registration process, the user may also identify other user mobile devices as being authorized to decrypt messages sent by the authorizing user. Alternatively, when the user encrypts a message, the VUD process may prompt the user for identification of VUD enabled devices of the authorized users. That is, identification of VUD enabled devices for receipt and decryption of messages does not have to be performed during an initial registration process. For example, identification of VUD enabled devices may entered by the user during initiation of the VUD process or before a particular message is encrypted.

An encryption code may then be associated with the registering user and a decryption code is associated with the authorized receiving users in operation 306. For example, the encryption code and an identity of the corresponding user or the user's device and the decryption code and an identity for each authorized user device may be stored in the VUD User and Code database 109.

The encryption code and/or decryption codes may be the same or different and may take any suitable form for encrypting and/or decrypting data, such as text, images, video, audio, etc. In one implementation, the encryption code may take the form of a private key (i.e., only provided to the encrypting device), while the decryption code takes the form of a public key (provided to all authorized devices). The codes may be randomly generated, e.g., by a VUD service, or defined by a user.

Codes may be generated for use by any suitable encryption or decryption algorithm, such as an asymmetric (or private/public) key-based algorithm, a symmetric key-based algorithm, or a hashing algorithm. Examples of such algorithms include the PGP (Pretty Good Privacy) available from PGP Corp. of Palo Alto, Calif. or the OpenPGP standard and GnuPG with PHP, as described in the document by J. Callas et al. entitled "OpenPGP Message Format", IETF, RFC2440, November 1998, which document is incorporated by reference in its entirety. An asymmetric key-based algorithm uses a different key for the encryption and decryption algorithms. A symmetric key-based algorithm generally uses the same key to encrypt and decrypt chunks or bits of the data. Hashing generally includes creating a digital summary of a string or file.

The encryption code is then sent to the registering user and the decryption code is sent to each authorized VUD enabled device in operation 308. In one embodiment, when an authorized VUD enabled device is used to capture an encrypted text, it can be said to receive encrypted message. The VUD enabled device can then utilize the previously received decryption code to decrypt the code and display the decrypted code on the mobile device's display. This technique would be very secure since decryption occurs securely on the mobile device without sending decrypted messages on-line, e.g., over a public network.

Alternatively, the VUD enable device can be configured to send the captured encrypted message to a VUD server for decryption. In this approach, potentially process intensive decryption algorithms are performed by a server, rather than consuming the processing resources of a mobile device, which may have limited resources. This alternative approach is described in the VUD process of FIG. 3. As shown, it may be determined whether an encrypted message has been received in operation 310. That is, a VUD server determines whether an encrypted message has been received by a particular mobile device. If an encrypted message has not been received, the procedure may again check for whether user registration has occurred. Otherwise, when an encrypted message is received, the message is decrypted using the code associated with the receiving user in operation 312. That is, the code that is associated with the particular mobile device is retrieved from the User and Code database 109.

The decrypted message may then be sent (e.g., by the VUD server) to the receiving user's mobile device for display purposes in operation 314. The VUD service may continue to check for other user registrations and other received encrypted messages and handle, accordingly.

Figure 4A:
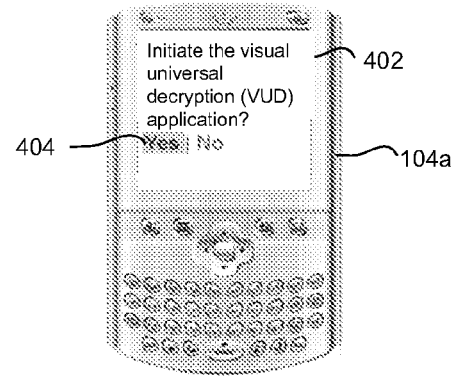
FIG. 4A illustrates a mobile device of a user as displaying a selectable VUD option in accordance with one embodiment of the present invention.

FIG. 4A illustrates mobile device 104a of user A as displaying a selectable VUD option 402 in accordance with one embodiment of the present invention. User A may select the option by selecting a "yes" button 404 or any other suitable input mechanism. The authorized user may also select such option 402 prior to capturing a decrypted message with her mobile device. Alternatively, this option may be displayed as a prompt to the user when a message is encrypted or when an image is captured by a mobile device.

Figure 4B:
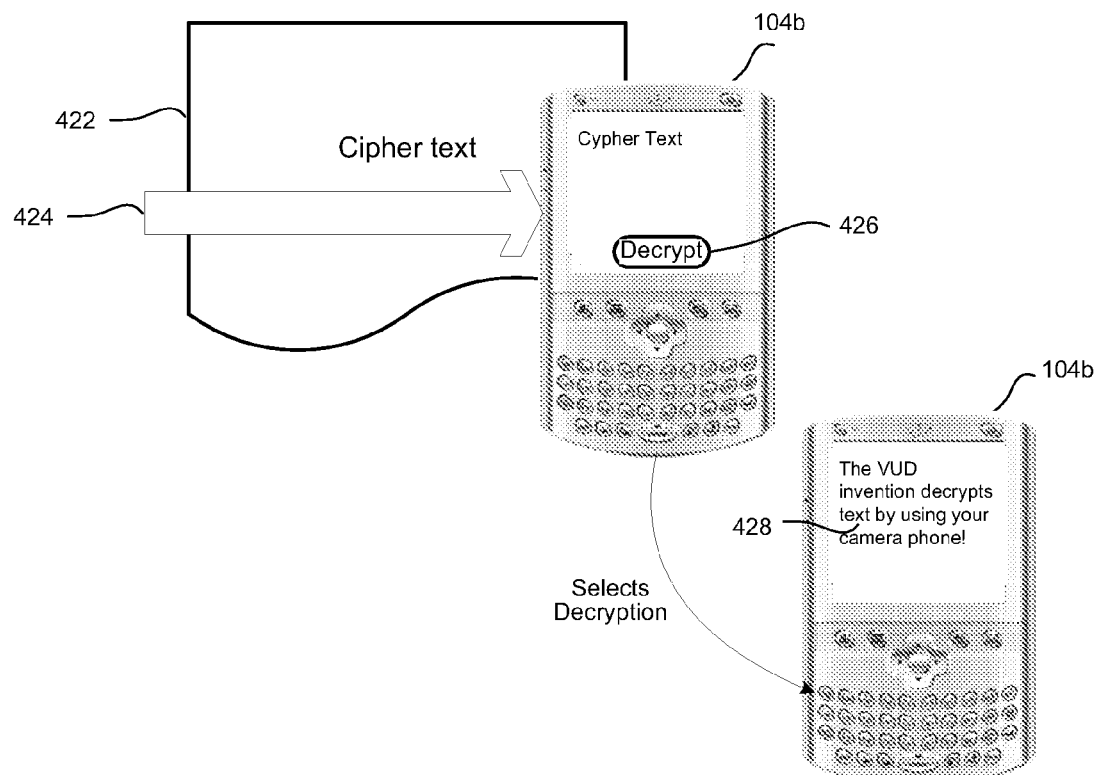
FIG. 4B illustrates a user passing an authorized mobile device over a hardcopy document that contains cyphertext so as to invoke a VUD process in accordance with one embodiment of the present invention.

The decryption techniques may also be used to decrypt a hardcopy sent by a user to another user. The receiving user only has to capture an image of the encrypted message to initiate the decryption process. FIG. 4B illustrates User B passing an authorized mobile device 104b over a hardcopy document 422 that contains cyphertext, for example, in direction 424. After the complete encrypted message has been read, the user may the select a decryption option 426 so as to invoke a decryption process in accordance with one embodiment of the present invention. Of course, the encrypted message of each image or video may be automatically decrypted after the user initiates a VUD process without the user selecting a decryption option for each message. Alternatively, a VUD process may automatically be invoked for all encrypted messages that are captured in one or more images or a video without user selection of a VUD or decryption option. As shown, the encrypted text 428 is automatically displayed on the mobile device 104b of user B.

The selectable decryption option feature 426 may be used to indicate when the user wishes an encrypted message in a set of one or more images or a video to be decrypted. This option 426 may also be used in other decryption applications, such as decrypting a message from a computer display or the like.

When an encrypted message is captured in an image, various techniques for processing such image to determine what text or object are to be decrypted may be utilized. Some techniques that may be used in image processing and object recognition analysis include but are not limited to: 1) generating a histogram that counts and graphs the total number of pixels at each grayscale level (A histogram may be used to detect underexposure or saturation in an image/video), 2) generating a line profile that plots the variations of intensity along a line (line profiles are sometime helpful in determining the boundaries between objects in an image/video), 3) performing intensity measurements to measure grayscale statistics in an image/video or a region of an image/video, such as but not limited to minimum intensity value, maximum intensity value, mean intensity value, standard deviation of the intensity value, 4) using look-up tables to convert grayscale values in the source image/video into other grayscale values in a transformed image/video, 5) using spatial filters to remove noise, smooth, sharpen or otherwise transform an image/video, such as but not limited to Gaussian filters for smoothing images/video, Laplacian filters for highlighting image/video detail, Median and nth order filters for noise removal and Prewitt, Roberts and Sobel filters for edge detection, 6) using grayscale morphology to filter or smooth the pixel intensities of an image/video, to alter the shape of regions by expanding bright areas at the expense of dark areas, remove or enhance isolated features, smooth gradually varying patterns and increase the contrast in boundary areas, 7) using frequency domain processing to remove unwanted frequency information, such as noise, 8) blob (binary large object) analysis in regards to touching pixels with same logic state (Blob analysis may be used to find statistical information such as the size of blobs or the number, location and presence of blob regions to locate particular objects in an image/video), 9) using thresholding to select ranges of pixel values in grayscale and color images/video that separate objects under consideration from the background, or 10) using binary morphological operations to extract and/or alter the structures of particles (e.g., blobs) in a binary image/video including primary binary morphology, advanced binary morphology.

Other techniques may include 11) using edge detection algorithms, 12) using gauging of dimensional characteristics of objects, 13) using image correlation to determine how close an image/video is to an expected image/video (e.g., comparing a newly captured image/video to a recorded image/video that has already been analyzed for object identification), 14) using pattern matching to locate regions of a grayscale image/video and determine how close the grayscale image/video matches a predetermined template (Pattern matching may be configured to find template matches regardless of poor lighting, blur, noise, shifting of the template or rotation of the template. For graphical components on a captured image/video, the size, shape, location, etc. that correspond to specific objects in an image/video may be predetermined which allows a template to be constructed for particular object sets), 15) using optical character recognition algorithms and methods, 16) using color matching to quantify which color, how much of each color and/or ratio of colors exist in a region of an image/video and compare the values generated during color matching to expected values to determine whether the image/video includes known reference object colors, and 17) using color pattern matching to locate known reference patterns in a color image/video.

Figure 5:
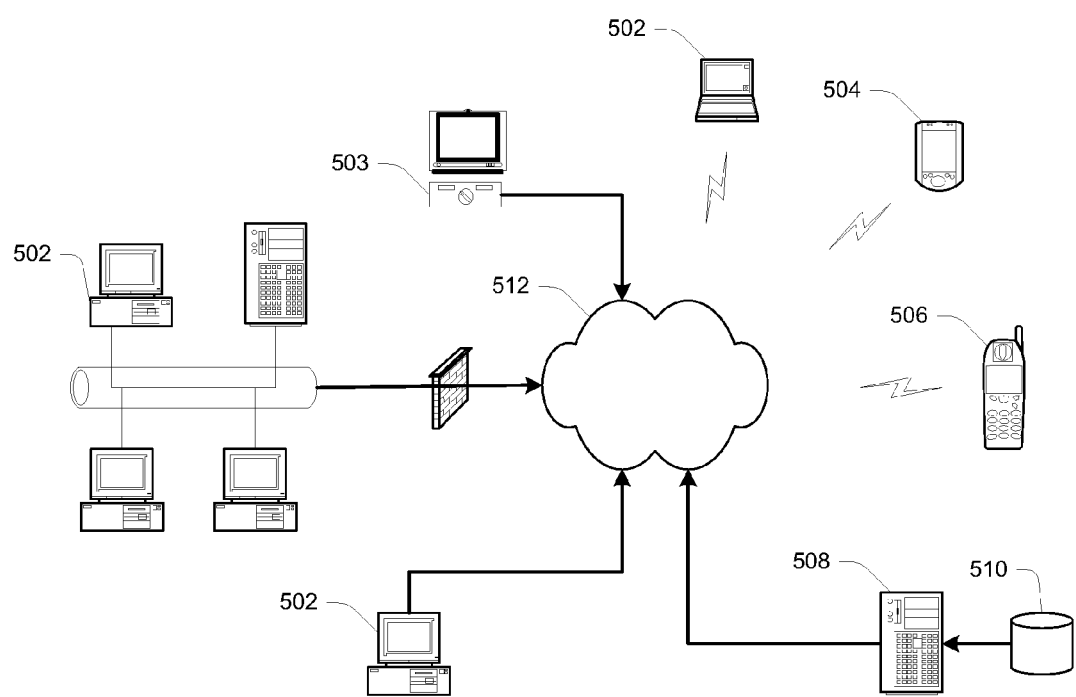
FIG. 5 is a simplified diagram of a network environment in which specific embodiments of the present invention may be implemented.

Embodiments for implementing and managing a VUD may be employed in a wide variety of diverse computing contexts. For example, as illustrated in FIG. 5, implementations are contemplated in which the relevant population of users interact with a diverse network environment via any type of computer (e.g., desktop, laptop, tablet, etc.) 502, media computing platforms 503 (e.g., cable and satellite set top boxes and digital video recorders), handheld computing devices (e.g., PDAs) 504, cell phones 406, or any other type of computing or communication platform.

And according to various embodiments, images/video that are processed in accordance with the invention may be obtained using a wide variety of techniques. For example, a user's interaction with a local application, web site or web-based application or service (e.g., using a mobile device's camera or VUD functions) may be accomplished using any of a variety of well known mechanisms for recording a user's behavior. However, it should be understood that such methods of obtaining images/video are merely exemplary and that images/video may be collected in many other ways.

VUD management may be handled according to the invention in some centralized manner. This is represented in FIG. 5 by server 508 and data store 510 that, as will be understood, may correspond to multiple distributed devices and data stores (e.g., as shown in FIG. 1). The invention may also be practiced in a wide variety of network environments (represented by network 512) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Figure 6:
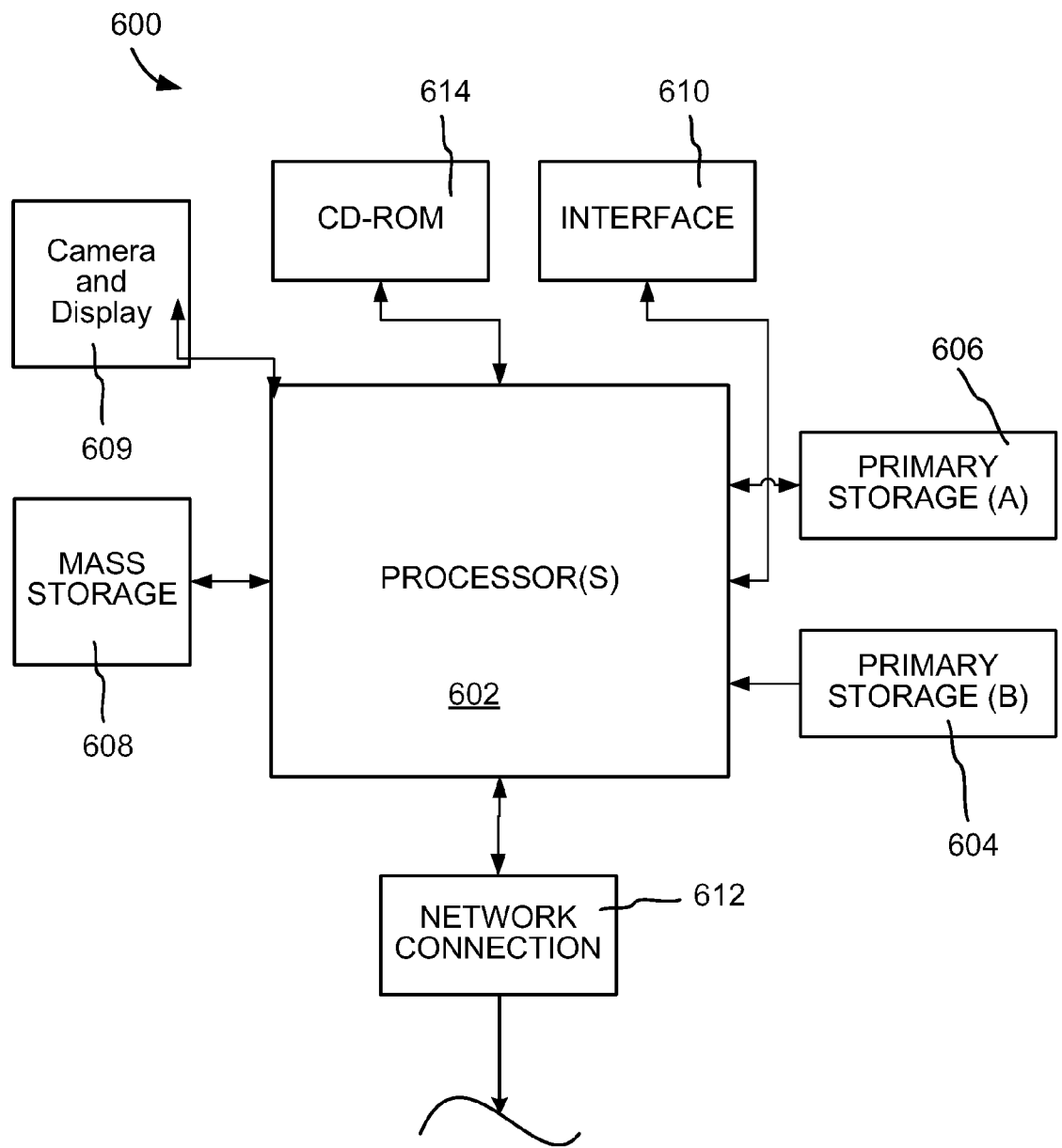
FIG. 6 illustrates a typical computer system that, when appropriately configured or designed, can serve as a system of this invention.

FIG. 6 illustrates a typical computer system that, when appropriately configured or designed, can serve as a VUD application or system of this invention. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and unprogrammable devices such as gate array ASICs or general purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described herein. A mass storage device 608 is also coupled bi-directionally to CPU 602 and provides additional data storage capacity and may include any of the computer-readable media described above. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 is also coupled to an interface 610 that connects to one or more input/output devices such as such as video monitors, track balls, mice, keyboards, microphones, speakers, touch-sensitive displays, transducer card readers, magnetic or paper tape readers, tablets, styluses, voice or handwriting recognizers, or other well-known input devices such as, of course, other computers. The CPU 602 may also be coupled with a display and camera 609, e.g., of a camera enabled mobile device. Finally, CPU 602 optionally may be coupled to an external device such as a database or a computer or telecommunications network using an external connection as shown generally at 612. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store images/video, decryption and encryption codes, mobile device identities or phone numbers, user identities, encrypted and decrypted messages, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method of performing decryption using a mobile device, comprising:
   receiving a decryption code at a mobile device of a first user, wherein the decryption code was generated and sent to the mobile device in response to a second user identifying the mobile device of the first user as being authorized to decrypt messages from the second user;
   capturing one or more images or a video of an encrypted message from the second user with a camera of the mobile device of the first user, the encrypted message originating from a remote device associated with the second user;
   using the decryption code, decrypting the encrypted message captured in the one or more images or video so as to provide a decrypted message; and
   presenting the decrypted message in the mobile device of the first user.

2. A method as recited in claim 1, wherein the decrypting operation is performed by, at the mobile device of the first user, automatically using the received decryption code to decrypt the encrypted message when a visual universal decryption option is selected at the mobile device of the first user.

3. A method as recited in claim 1, wherein the decrypting operation is performed by:
   automatically sending the encrypted message from the mobile device to a visual universal decryption server when a visual universal decryption option is selected; and
   receiving, at the mobile device, a decrypted message that is a result of decrypting the encrypted message when a visual universal decryption option is selected.

4. A method as recited in claim 1, wherein the decryption code was generated in response to the second user identifying a phone number of the mobile device of the first user.

5. A method as recited in claim 1, wherein presenting the decrypted message comprises outputting an audio of the decrypted message from an audio device of the mobile device.

6. A method as recited in claim 1, wherein the encrypted message is displayed in a display of a computer system and captured in one or more images or video of such display.

7. A method as recited in claim 1, wherein the encrypted message is visually presented on a hardcopy document and captured in one or more images or video of such hardcopy document.

8. A method as recited in claim 1, wherein the decrypting operation is performed after a complete encrypted message has been captured in the one or more images or a video.

9. A mobile device for performing decryption using a mobile device, comprising:
   a camera for capturing images/video;
   a display for displaying the captured images/video;
   at least one a processor; and
   at least one memory, the at least one processor and/or memory being configured for:
      receiving a decryption code at the mobile device of a first user, wherein the decryption code was generated and sent to the mobile device in response to a second user identifying the mobile device of the first user as being authorized to decrypt messages from the second user;
      capturing one or more images or a video of an encrypted message from the second user with a camera of the mobile device of the first user, the encrypted message originating from a remote device associated with the second user;
      using the decryption code, decrypting the encrypted message captured in the one or more images or video so as to provide a decrypted message; and
      presenting the decrypted message in the display of the mobile device.

10. A mobile device as recited in claim 9, wherein the decrypting operation is performed by:
    receiving a decryption code into the mobile device; and
    automatically using the received decryption code to decrypt the message when a visual universal decryption option is selected.

11. A mobile device as recited in claim 9, wherein the decrypting operation is performed by:
    automatically sending the encrypted message from the mobile device to a visual universal decryption server when a visual universal decryption option is selected; and
    receiving, at the mobile device, a decrypted message that is a result of decrypting the encrypted message when a visual universal decryption option is selected.

12. A mobile device as recited in claim 9, wherein the decryption code was generated in response to the second user identifying a phone number of the mobile device of the first user.

13. A mobile device as recited in claim 9, wherein presenting the decrypted message comprises outputting an audio of the decrypted message from an audio device of the mobile device.

14. A mobile device as recited in claim 9, wherein the encrypted message is displayed in a display of a computer system and captured in one or more images or video of such display.

15. A mobile device as recited in claim 9, wherein the encrypted message is visually presented on a hardcopy document and captured in one or more images or video of such hardcopy document.

16. A mobile device as recited in claim 9, wherein the decrypting operation is performed after a complete encrypted message has been captured in the one or more images or a video.

17. At least one non-transitory computer readable storage medium having computer program instructions stored thereon that are arranged to perform the following operations:
    receiving a decryption code at a mobile device of a first user, wherein the decryption code was generated and sent to the mobile device in response to a second user identifying the mobile device of the first user as being authorized to decrypt messages from the second user;
    capturing one or more images or a video of an encrypted message from the second user with a camera of the mobile device of the first user, the encrypted message originating from a remote device associated with the second user;
    using the decryption code, decrypting the encrypted message captured in the one or more images or video so as to provide a decrypted message; and
    presenting the decrypted message in the mobile device of the first user.

18. At least one non-transitory computer readable storage medium as recited in claim 17, wherein the decryption code was generated in response to the second user identifying a phone number of the mobile device of the first user.

19. At least one non-transitory computer readable storage medium as recited in claim 17, wherein presenting the decrypted message comprises outputting an audio of the decrypted message from an audio device of the mobile device.

20. At least one non-transitory computer readable storage medium as recited in claim 17, wherein the encrypted message is visually presented on a hardcopy document and captured in one or more images or video of such hardcopy document.

21. At least one non-transitory computer readable storage medium as recited in claim 17, wherein the decrypting operation is performed after a complete encrypted message has been captured in the one or more images or a video.

* * * * *